United States Patent
Ardo

(10) Patent No.: US 11,234,014 B2
(45) Date of Patent: Jan. 25, 2022

(54) METHOD AND DEVICE FOR ENCODING A SEQUENCE OF IMAGE FRAMES USING A FIRST AND A SECOND ENCODER

(71) Applicant: Axis AB, Lund (SE)

(72) Inventor: Bjorn Ardo, Lund (SE)

(73) Assignee: AXIS AB, Lund (SE)

( * ) Notice: Subject to any disclaimer, the term of this patent is extended or adjusted under 35 U.S.C. 154(b) by 96 days.

(21) Appl. No.: 16/708,338

(22) Filed: Dec. 9, 2019

(65) Prior Publication Data

US 2020/0186822 A1 Jun. 11, 2020

(30) Foreign Application Priority Data

Dec. 11, 2018 (EP) .................................... 18211477

(51) Int. Cl.
| | |
|---|---|
| H04N 19/517 | (2014.01) |
| H04N 19/119 | (2014.01) |
| H04N 19/139 | (2014.01) |
| H04N 19/172 | (2014.01) |
| H04N 19/127 | (2014.01) |

(52) U.S. Cl.
CPC ......... *H04N 19/517* (2014.11); *H04N 19/119* (2014.11); *H04N 19/127* (2014.11); *H04N 19/139* (2014.11); *H04N 19/172* (2014.11)

(58) Field of Classification Search
CPC ... H04N 19/119; H04N 19/517; H04N 19/139
See application file for complete search history.

(56) References Cited

U.S. PATENT DOCUMENTS

| | | | |
|---|---|---|---|
| 10,057,570 B2* | 8/2018 | Ye ........................... | H04N 19/46 |
| 2010/0296575 A1 | 11/2010 | Lee et al. | |
| 2010/0322315 A1 | 12/2010 | Hasuo | |
| 2012/0183074 A1 | 7/2012 | Fuldseth | |
| 2013/0064299 A1 | 3/2013 | Fukushima | |
| 2014/0153635 A1 | 6/2014 | Zhang et al. | |
| 2014/0165125 A1* | 6/2014 | Lee ...................... | H04N 21/431 |
| | | | 725/118 |
| 2017/0269709 A1 | 9/2017 | Yamasaki et al. | |

FOREIGN PATENT DOCUMENTS

| | | |
|---|---|---|
| EP | 3220642 A1 | 9/2017 |
| WO | 2017/140945 A1 | 8/2017 |

OTHER PUBLICATIONS

Roitzsch, "Slice-Balancing H.264 Video Encoding for Improved Scalability of Multicore Decoding," EMSOFT'07, Sep. 30-Oct. 3, 2007, Salzburg, Austria.

* cited by examiner

*Primary Examiner* — Kyle M Lotfi
(74) *Attorney, Agent, or Firm* — Volpe Koenig

(57) ABSTRACT

A method and device for encoding a plurality of image frames uses two separate encoders, where each image frame is divided into two portions to each be encoded by one of the two encoders, where the image frame is divided to minimize motion across the boundary between the two portions, such that the two encoders may operate independently of each other without a substantial bit rate penalty or reduced encoding quality.

14 Claims, 4 Drawing Sheets

METHOD AND DEVICE FOR ENCODING A SEQUENCE OF IMAGE FRAMES USING A FIRST AND A SECOND ENCODER

TECHNICAL FIELD

The present invention relates to the field of image encoding. In particular, it relates to a method and device for encoding a plurality of image frames using two separate encoders, where each image frame is divided into two portions to each be encoded by one of the two encoders.

BACKGROUND

In recent years the numbers of monitoring cameras, e.g., network camera monitoring systems, have increased. Similarly, the possible image resolution of an image captured by an image sensor of a monitoring camera has increased. This is advantageous from a monitoring perspective, since more details in the monitored scene may be captured. However, from an encoder perspective, this development has resulted in that an image captured by a high-resolution image sensor may be too large for one encoder (encoder chip) to encode at an acceptable frame rate. Advantageously, the concept of tiles/slices in, e.g. H.265 encoding may be employed to produce a single encoded image from image data encoded by a plurality of encoders, such as two encoders. Consequently, image data of an image frame can be divided into at least a first and a second portion of image data, where the first portion is encoded by a first encoder, and the second portion is encoded by a second encoder, wherein the two encoders have separate buffer memories (reference buffers) for reference encoding.

A problem arises when motion vectors are to be found, as this means that theoretically, both encoders need to have access to the entire reference frame, requiring copying in both directions between the two encoders. In practice, a motion vector search is not performed in the entire reference frame, though, but in a limited search window, in order for the search to be finished in a short enough time to maintain a desired frame rate. Therefore, it will not be necessary to copy the whole reference frame slice or tile from one encoder to the other, but only a sufficiently large portion to accommodate the search window.

However, copying image data from the first encoder to the second encoder, and vice versa, is cumbersome. It is also necessary to synchronise to ensure that both encoders have completed a previous image frame before encoding of a new image frame starts.

To avoid reading and copying from the reference buffer of the other encoder, the search window for the motion vector search may be restricted. In particular, the encoders may be restricted to not search for motion vectors in reference frames produced by the other encoder. This may be achieved in a system that allows for using different search windows for different parts of the image by setting the motion search window at the boundary between the portions of the image data such that motion search will not be performed over the boundary.

A drawback of that approach is that it may be costlier (require more bitrate) to encode image data near the boundary, due to motion in the image data between image frames. In the case of motion in the image data near the boundary, the motion prediction (using a block matching algorithm) will likely not work well for blocks of pixels near the boundary, since image content may move from the image data encoded by the first encoder in a first image frame to the image data encoded by the second encoder for a subsequent image frame. This in turn may result in that these block of pixels will be encoded I-blocks, or encoded as P-blocks with much residual data to be encoded, thus increasing the bit rate.

There is thus a need for improvements within this context.

SUMMARY

In view of the above, overcoming or at least mitigating the problems discussed above would be preferable. In particular, a device and method where image data of an image frame into two portions and a first and a second encoder for encoding the respective portions of image data operate independently of each other without a substantial bit rate penalty or reduced encoding quality.

According to a first aspect, a method for encoding a sequence of image frames using a first and a second encoder which operate independently of each other comprises:

estimating motion in the sequence of image frames to determine at least one of: a predominant direction of motion in the image frames, and positions in the image frames where motion is present;

based on the estimated motion, dividing image data of each image frame in the sequence into at least a first and a second portion of image data, wherein a boundary between the first and the second portion is positioned to minimize the estimated motion across the boundary;

encoding the first portion of image data of each image frame in the sequence using the first encoder; and encoding the second portion of image data of each image frame in the sequence using the second encoder.

In this disclosure, the term "first and second encoder which operate independently of each other" generally means that no transfer of data is necessary between the first and second encoder for encoding purposes. In other words, each of the first and the second encoder only refers to reference frames produced by itself when performing inter-coding. In yet other words, only image data which has been encoded by the first encoder will be stored (in a decoded version) in the reference buffer of the first encoder and used for inter-coding purposes (as reference data for block matching of the first portion of image data of a particular image frame). Similarly, only image data which has been encoded by the second encoder will be stored (in a decoded version) in the reference buffer of the second encoder and used for inter-coding purposes (as reference data for block matching of the second portion of image data of a particular image frame).

Generally, the dividing of the image data results in (at least) two coherent portions of image data wherein the first portion of image data may represent a first tile or slice and wherein the second portion of image data may represent a second tile or slice. Consequently, the boundary may be both straight or stepped. For example, for a specific row or column of macroblocks (CTUs) in the image data of an image frame, some of the macroblocks may be part of the first portion of image data, and the remaining macroblocks may be part of the second portion of image data.

By estimating motion in the sequence of image frames, the image data of each image frame may be divided into at least a first and a second portion to minimize the (estimated) motion across the boundary between the first and second portion. By doing this, the bitrate may not be substantially increased because of the use of separate encoder with separate buffer memories, where no copying of reference data is performed between the two encoders. Since dividing the image data according to the above is done, the motion prediction will generally work better for more block of pixels (macroblocks, coding units [CU], coding tree units [CTU]), even though no data is copied between the first and second encoder. In other words, by positioning the boundary according to the above, the problem of high bit rate cost for additional I-blocks, or P-blocks with a high cost for encoding the residual, may be reduced.

Using first and second encoders which operate independently of each other permits the synchronization requirement between the two encoders to be reduced or removed. Since no data is required to be copied between the first and second encoder, the encoders can encode their respective portions of image data for a plurality of image frames without having to wait for the other encoder to complete encoding of e.g. data to be used for inter-encoding purposes.

The motion in the sequence of image frames may be estimated in many different ways. For example, a separate motion estimator may analyze previous image frames (e.g. image frames corresponding to a time span of a second, three seconds, etc., of a captured video sequence), to estimate motion in the sequence of image frames. Such estimation may be performed on a down sampled version of the image frames for reducing computational complexity. In other embodiments, motion vectors of previously encoded image frames are analyzed to estimate the motion in the sequence of image frames. In yet other embodiments, pan-tilt motion of a video capturing device capturing the sequence of image frames may be analyzed to determine the estimated motion.

The estimated motion may be used to determine a predominant direction of motion in the image frames, i.e. determine if the motion is generally horizontal or vertical in the sequence of image frames. In other embodiments, the estimated motion may be used to determine positions in the image frames where motion is present, for example if motion is mostly present in the upper corner of image frames of the sequence the image frames, or in a section in the middle of image frames of the sequence of image frames, etc.

According to some embodiments, the boundary between the first and the second portion is positioned in a same location and direction for a plurality of image frames of the sequence. Advantageously, the computational complexity of the method is reduced. In this embodiment, the first and second portions occupy the same spatial region over all of the plurality of image frames. The encoders thus restrict motion estimation to the same spatial area in the previous frame (reference frame). In other words, both the first and the second encoder restricts its search window for block matching of a block of pixels in the first portion and the second portion of image data, respectively, to a reference frame produced by itself.

According to some embodiments, the plurality of image frames of the sequence forms a first group of pictures, GOP. The motion estimation may thus be done for only the first image frame of the GOP, which will reduce the computational complexity of the encoding method, and the dividing of image data determined for the first image frame may be similarly performed for the rest of image frames of the GOP.

According to some embodiments, the boundary between the first and the second portion is positioned in a first position and direction for the first GOP and in a second position and direction for a second GOP. Advantageously, a sequence of image frames capturing a dynamic scene (or captured by a camera which moves, pan-tilt, differently between the first and second GOP, etc.,) may be efficiently encoded. It should be noted that according to some embodiments, the direction of the boundary is kept between the first and second GOP, but the position is adjusted, e.g. to divide the computational burden of encoding between the first and second encoder in a different way, or in view of a new privacy mask (see further below), etc.

According to some embodiments, upon determining that the predominant direction of motion in the image frames is a horizontal direction, the direction of the boundary is horizontal. Similarly, upon determining that the predominant direction of motion in the image frames is a vertical direction, the direction of the boundary is vertical. Advantageously, a low complexity method may be achieved. For example, if there is a lot of vertical motion in the image, the image is divided vertically (tiling) and the left and the right part are encoded separately in different encoders. If there is a lot of horizontal motion in the image, the image is divided horizontally (slicing), and the top and the bottom part of the image are encoded separately in different encoders.

According to some embodiments, the dividing of image data of each image frame of the sequence into at least a first and a second portion of image data further is based on a map of quantization parameters used when encoding the sequence of image frames, the map of quantization parameters specifying quantization parameters used when compressing different regions of image data of the image frames of the sequence, wherein the quantization parameters are weighted in to favor positioning the boundary in a region of image data encoded with a higher quantization parameter over a region of image data encoded with a lower quantization parameter. Advantageously, the bitrate may be further reduced, since by placing boundary between the first and second portions in an image region which often have a relatively higher quantization parameter (e.g. QP value), even if motion exist in this image region, the resulting intra encoded block of pixels will be more compressed due to the higher quantization parameter.

According to some embodiments, the dividing of image data of each image frame of the sequence into at least a first and a second portion of image data further is based on at least one privacy mask applied to the sequence of image frames, wherein a position and size of each of the at least one privacy masks is weighted in to favor positioning the boundary in a region of image data corresponding to a privacy mask over a region of image data not corresponding to a privacy mask. Advantageously, the bitrate may be further reduced, since by placing the boundary between the first and second portions in an image region part of a privacy mask zone, even if motion over the boundary exist in this image region, the block of pixels in the privacy mask zone will anyway be e.g. encoded as a single color block of pixels and thus not require much bitrate.

According to some embodiments, the step of estimating motion comprises receiving data indicative of a pan-tilt, PT, motion of a video capturing device capturing the sequence of image frames, wherein upon the received data indicating a panning motion, the direction of the boundary is horizontal; wherein upon the received data indicating a tilting motion, the direction of the boundary is vertical. This embodiment represents a low complexity functionality of determining a predominant direction of motion in the image frames.

According to some embodiments, image data of an image frame in the sequence is divided into at least a first and a second portion of image data based on motion which is estimated from previous image frames in the sequence. This allows for parallel processing of the task of estimating the motion and the task of encoding of the image frames.

According to some embodiments, the step of estimating motion comprises receiving data indicating motion present in the previous image frames in the sequence, and using the received data for estimating motion from the previous image frames. The data indicating motion may be determined by a motion estimating unit separate from the two encoders, advantageously allowing for dividing tasks of the encoding method described herein between different units to further improve efficiency of the method. The received data may take any suitable form, from a very simple data (e.g. a Boolean value describing if the predominant direction of motion in the image frames is vertical or horizontal) to more complex data (e.g. a map of values or motion vectors describing motion in separate parts of the image frames).

According to some embodiments, the step of estimating motion comprises analyzing motion vectors calculated by the first and the second encoder when encoding the first and the second portions, respectively, of the previous image frames. Advantageously, data already produced by the encoders may be used for estimating motion. For example, an absolute value of the x-values of all motion vectors may be averaged to estimate motion in a horizontal direction, and compare this with an average of the absolute values of the y-values of all motion vectors, to determine a predominant direction of motion in the image frames.

According to some embodiments, the method further comprises the steps of: for each image frame in the sequence, receiving, by a stream multiplexer, the first portion of image data encoded by the first encoder and the second portion of image data encoded by the second encoder, and forming an encoded image, the encoded image comprising the encoded first portion of image data as a first tile or a first slice and the encoded second portion of image data as a second tile or a second slice.

Advantageously, the data encoded by the separate encoders are multiplexed into a single encoded stream. In some embodiments, the encoded data from the first encoder, and the encoded data from the second encoder is sent to a separate stream multiplexer for forming (multiplexing) an encoded image stream. In other embodiments, one of the two encoders are functioning as the stream multiplexer.

According to a second aspect, a computer program product comprises a computer-readable medium with computer code instructions adapted to carry out the method of the first aspect when executed by a device having processing capability.

According to a third aspect, a device for encoding a sequence of image frames, comprises:

a processor configured to:

estimate motion in the sequence of image frames to determine at least one of: a predominant direction of motion in the image frames, and positions in the image frames where motion is present;

based on the estimated motion, divide image data of each image frame in the sequence into at least a first and a second portion of image data, wherein a boundary between the first and the second portion is positioned to minimize the estimated motion across the boundary;

a first encoder configured to encode the first portion of image data of each image frame in the sequence; and a second encoder configured to encode the second portion of image data of each image frame in the sequence, wherein the first and the second encoder operates independently of each other.

According to some embodiments, the device further comprises a stream multiplexer;

wherein the stream multiplexer is arranged to receive the first portion of image data encoded by the first encoder and the second portion of image data encoded by the second encoder, and to form an encoded image, the encoded image comprising the encoded first portion of image data as a first tile or a first slice and the encoded second portion of image data as a second tile or a second slice.

The second and third aspects may generally have the same features and advantages as the first aspect. It is further noted that the embodiments relate to all possible combinations of features unless explicitly stated otherwise.

BRIEF DESCRIPTION OF THE DRAWINGS

The embodiments, as well as additional features, will be better understood through the following illustrative and non-limiting detailed description of preferred embodiments, with reference to the appended drawings, where the same reference numerals will be used for similar elements wherein.

DETAILED DESCRIPTION OF EMBODIMENTS

The embodiments will now be described more fully hereinafter with reference to the accompanying drawings. The systems and devices disclosed herein will be described during operation.

In newer encoding methods, e.g., Advanced Video Coding (AVC) (also called H.264) and High Efficiency Video Coding (HEVC) (also called H.265), the concept of tiles (only supported by HEVC encoding) and slices has been introduced. Tiles and slices allow for the image to be divided into a grid of rectangular (or substantially rectangular, as will be described below in conjunction with FIG. 4) regions that can be decoded/encoded in parallel. In other words, this concept may be used for parallel processing purposes, to let separate encoders or cores of an encoder encode an image frame in parallel. In this disclosure, separate encoders (a first and second encoder), having separate buffer memory for reference encoding (inter encoding, P-frame encoding, B-frame encoding), are employed, using the concept of tiles/slices to encode an image frame. In this setup, a problem arises when motion vectors are to be found, as this means that theoretically, both encoders need to have access to the entire reference frame, or at least the part needed according to the size of the search window. The present disclosure is aimed at an encoding method which facilitates encoding using the above described setup, and where the encoders do not copy data from each other for inter encoding purposes, but still achieves encoding of image frames without substantial penalty when it comes to bit rate or decreased quality of the encoded image frames.

Figure 1:
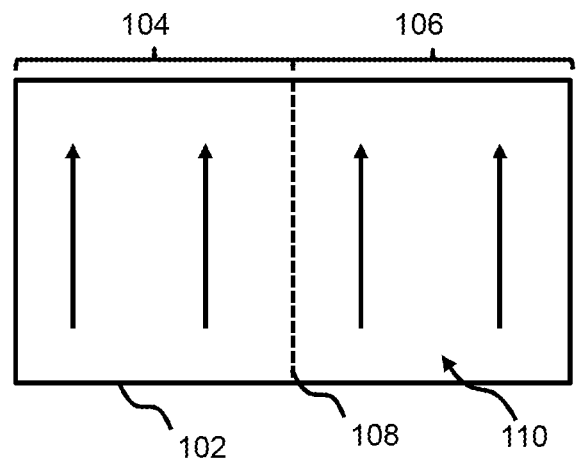
FIGS. 1-3 show examples of how to divide an image frame into two portions of image data based on estimated motion in the image frame.

FIG. 1 shows by way of example a way of dividing image data of an image frame 102 into a first 104 and second 106 portion. In this embodiment, motion 110 (represented in FIGS. 1-5 by arrows) in the image data of the image frame 102 have been estimated to have a predominant direction which is vertical, which means that also a direction of a boundary 108 between the first 104 and the second portion 106 is vertical. A position of the boundary 108 is in this case chosen to achieve equal size of the first 104 and second 106 portion of image data. This will advantageously result in similar computational burden for the two encoders that will independently encode the two portions 104, 106. However, it should be noted that if e.g. one of the encoders have overcapacity, the boundary 108 may be placed differently to better take advantage of available computational resources.

In the case of FIG. 1, by dividing image data of each image frame in the sequence into the first 104 and a second 106 portion of image data, wherein the boundary 108 between the first and the second portion is vertical, the estimated motion across the boundary is minimized. Advantageously, this will result in that the encoders may, when inter encoding image frames of the sequence of image frames, still succeed with block matching between a currently encoded image frame and a previously encoded reference frame even though no copying of image data for inter encoding purposes is performed between the two encoders. This is schematically shown in FIG. 8.

Figure 8:
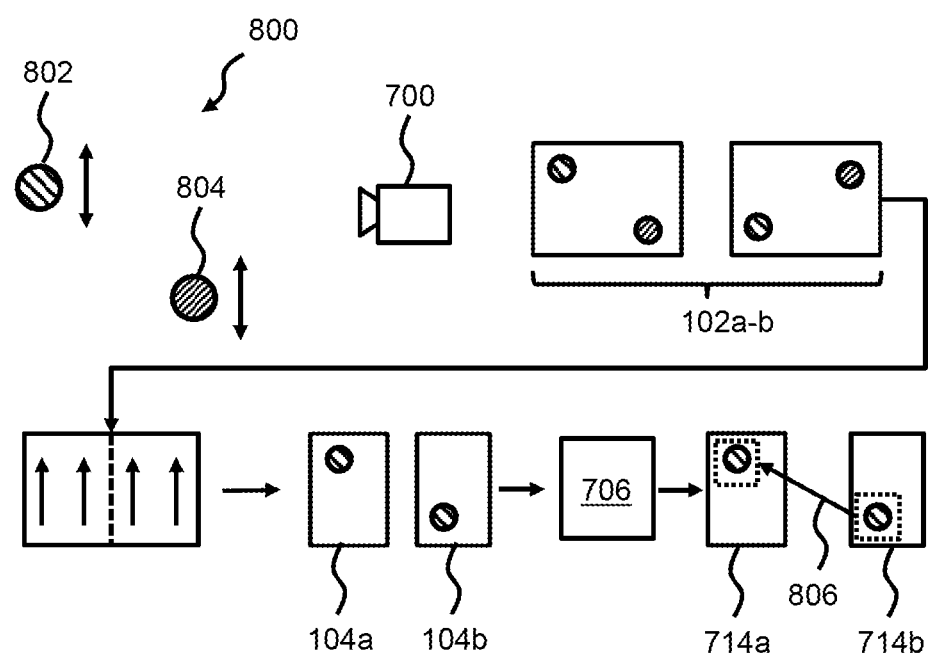
FIG. 8 shows a schematic overview of the encoding method according to embodiments.

In FIG. 8, a scene 800 comprising two vertically moving objects 802, 804 are shown. The scene 800 is captured by a video camera 700, which produces a sequence of image frames 102 comprising a first 102a and second 102b image frame. The motion of the image frames 102 are estimated (as will be further described below), and the estimation results in that a predominant direction of motion in the image frames 102a-b is determined to be vertical. This result in that image data of the image frames 102a-b in the sequence is divided into at least a first 104a-b and a second (not shown in FIG. 8) portion of image data. The first portions 104a-b are sent to a first encoder 706 for encoding. The second portions are sent to a second encoder for encoding, but this is omitted from FIG. 8 for ease of description. For a first 104a of the first portions 104a-b (i.e. image data of the first image frame 102a), the encoder 706 in this case performs intra-encoding into encoded data 714a. For a second 104b of the first portions 104a-b (i.e. image data of the second image frame 102b), the encoder in this case performs inter encoding. Since the first and second encoders operate independently of each other as defined above, the first encoder 706 only has data corresponding to (i.e. decoded from) the encoded data 714a of the first 104a of the first portions 104a-b to use as reference for inter encoding of the second 104b of the first portions 104a-b. However, since the image data previously has been divided based on the estimated predominant direction of motion in the image frames 102a-b, the block matching 806 of image data corresponding to (depicting) the first object 802 of the captured scene 802 will find similar image data between the portions of image data encoded by the first encoder 706 as illustrated in FIG. 8 by the dashed squares. Bitrate may thus be kept low. Compare this to dividing the image data of the image frames 102a-b in a horizontal direction, where block matching for the image data corresponding to (depicting) the first object 802 of the captured scene 802 would fail, resulting in an increased bit rate.

In the example of FIG. 8, the boundary between the first and the second portion is positioned in a same location and direction for a plurality of image frames 102a, 102b of the sequence. This means that motion only needs to be estimated for e.g. the first image frame 102a, and that this estimation is used for a plurality of image frames (in FIG. 8, for the second image frame 102b, but typically for a larger plurality of image frames). In some embodiments, the plurality of image frames of the sequence forms a GOP, which means that image data is divided in a same way for all image frames of the GOP. In some embodiments, for a subsequent GOP, a new motion estimation may be performed, resulting in that the boundary between the first and the second portion of image data is positioned in a first position and direction for the first GOP and in a second position and direction for a second GOP. In other embodiments, the step of motion estimation is performed less frequent, for example based on a time of day, such that motion estimation is e.g. performed less frequent during night time compared to during day time. In these embodiments, and other embodiments, the boundary between the first and the second portion is positioned in a same location and direction for a plurality of GOPs.

FIGS. 2-6 shows other ways of dividing image data of an image frame 102 based on estimated motion in the image frame. However, it should be noted that the above description of FIGS. 2 and 8 applies to the embodiments of FIG. 2-6, mutatis mutandis.

Figure 2:
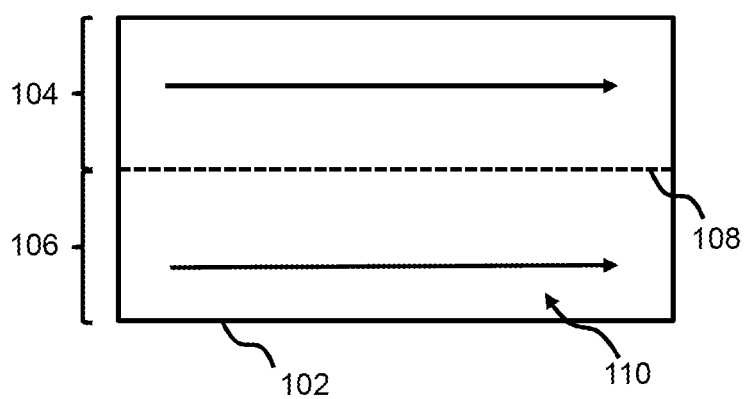

FIG. 2 shows by way of example another way of dividing image data of an image frame 102 into a first 104 and second 106 part. FIG. 2 is similar to FIG. 1. However, in this embodiment, motion 110 in the image data of the image frame 102 have been estimated to have a predominant direction which is horizontal, which means that also a direction of a boundary 108 between the first 104 and the second portion 106 is horizontal.

Figure 3:
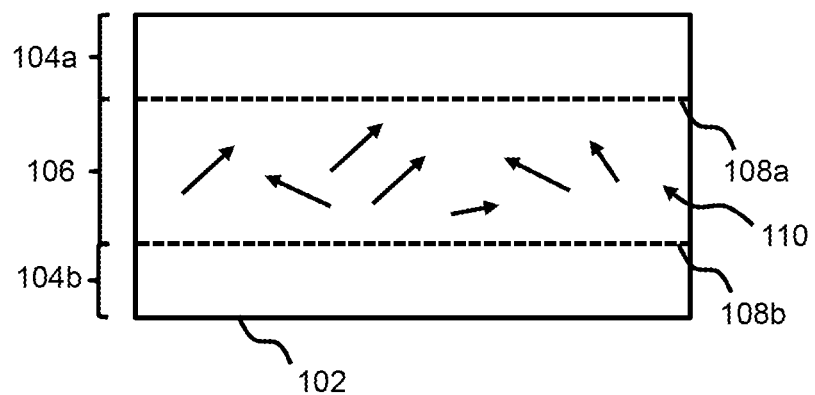

FIG. 3 shows by way of example another way of dividing image data of an image frame 102. Different to the embodiments of FIGS. 1-2, in FIG. 3, motion 110 in the image data of the image frame 102 has been used to estimate positions in the image frame 102 where motion is present. In the example of FIG. 3, motion 110 is (mainly) present in a middle part of the image frame 102. The image frame 102 may for example depict a scene with a busy street in the middle (a lot of motion), and houses on both side of the street (little motion). Consequently, the image data of the image frame 102 is divided such that image data 106 containing most of the motion is encoded by one encoder. To facilitate similar computational burden for the two encoders, the image data is divided into three portions 104a, 104b, 106, where one of the encoders encodes the portion 106 with motion, and the other encoder encodes the remaining of the image data, i.e. the upper portion 104a and the lower portion 104b. In other embodiments, one of the encoders would encode both the portion 106 with the motion, and one of the other portions 104a, 104b, e.g. the lower portion 104b while the other encoder would encode the upper portion 104a. It should be noted that the image frame 102 may, in a similar way as described above, be divided into more areas based on the estimated motion. For example, more areas with or without motion may be determined, where the encoding of these areas can be performed by the different encoders to e.g. facilitate similar computational burden for the encoders.

Figure 4:
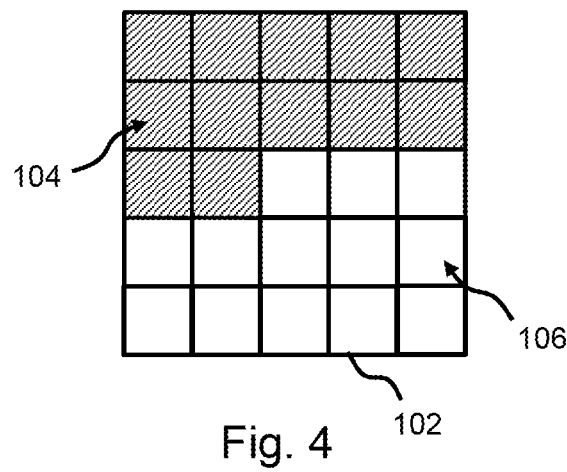
FIG. 4 shows an example of a stepped boundary between a first and second portion of image data of an image frame.

In FIGS. 1-3, the boundaries between the portions of image data encoded by the first and second encoder are shown as straight boundaries. However, it should be noted that a stepped boundary is equally possible, which is shown in FIGS. 4. H.264 and H.265 support such shaped slices/ tiles, and consequently, a portion of image data as described herein is not restricted to a shape of a rectangle. As shown in FIG. 4, for a specific row of macroblocks/coding units (CU, CTU) (shown as squares in FIG. 4) in the image data of an image frame 102, some of the macroblocks may be part of the first portion 104 of image data, and the remaining macroblocks may be part of the second portion 106 of image data. For example, for the image frame 102 in FIG. 4, the macroblocks of the third row are divided between the first portion 104 of image data and the second portion 106 of the image data.

Figure 5:
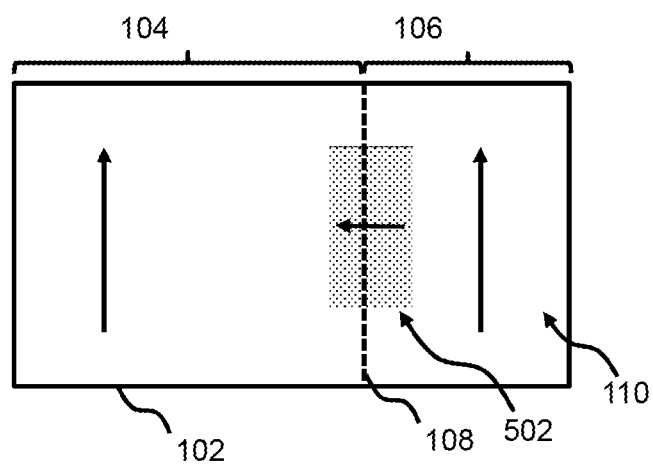
FIG. 5 shows by way of example positioning of a boundary between a first and second portion of image data of an image frame based on a privacy mask.
Figure 6:
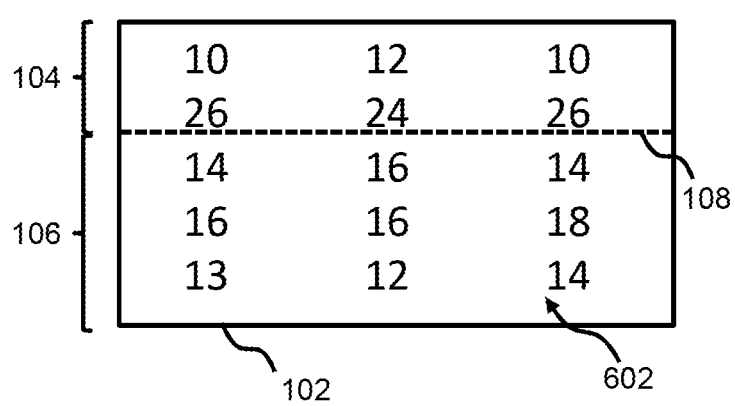
FIG. 6 shows by way of example positioning of a boundary between a first and second portion of image data of an image frame based on a map of quantization parameters.

The dividing of the image data of an image frame may be based on other data than the estimated motion. Since there is a larger risk that macroblocks close to the boundary may require more bits to be encoded compared to macroblocks further from the border, it may be advantageous to place to boundary to mitigate this risk. FIGS. 5 and 6 show such embodiments.

For example, privacy masks to be applied to the sequence of image frames may advantageously be weigh in to further reduce the bit rate. Privacy masking is a feature which is used to protect personal privacy by concealing parts of the image frame from view with a masked area. This is shown in FIG. 5 where a privacy mask 502 is positioned to the right in the image frame 102. By placing the boundary between the first 104 and second 106 portions in an image region which is part of the privacy mask zone 502, even if motion 110 over the boundary 108 exist in this image region, the block of pixels in the privacy mask zone 502 will anyway be e.g. encoded as a single color block of pixels and thus not require much bitrate. Consequently, according to some embodiments, the dividing of image data of each image frame of the sequence into at least a first 104 and a second 106 portion of image data further is based on at least one privacy mask 502 applied to the sequence of image frames, wherein a position and size of each of the at least one privacy masks 502 is weighted in to favor positioning the boundary 108 in a region of image data corresponding to a privacy mask 502 over a region of image data not corresponding to a privacy mask.

According to other embodiments, a boundary is positioned based on quntization parameter values. The quantization parameters controls the amount of compression for every Macroblock/CU in a frame. Large values mean that there will be higher quantization, more compression, and lower quality. Lower values mean the opposite. FIG. 6 schamtically shows a map 602 of quantization parameters used when encoding a particular image frame 102. The map 602 is thus specifying quantization parameters used when compressing different regions of image data of the image frames of the sequence. In this embodiment, as shown in FIG. 8 the quantization parameters are weighted in to favor positioning the boundary 108 in a region of image data encoded with a higher quantization parameter over a region of image data encoded with a lower quantization parameter.

Figure 7:
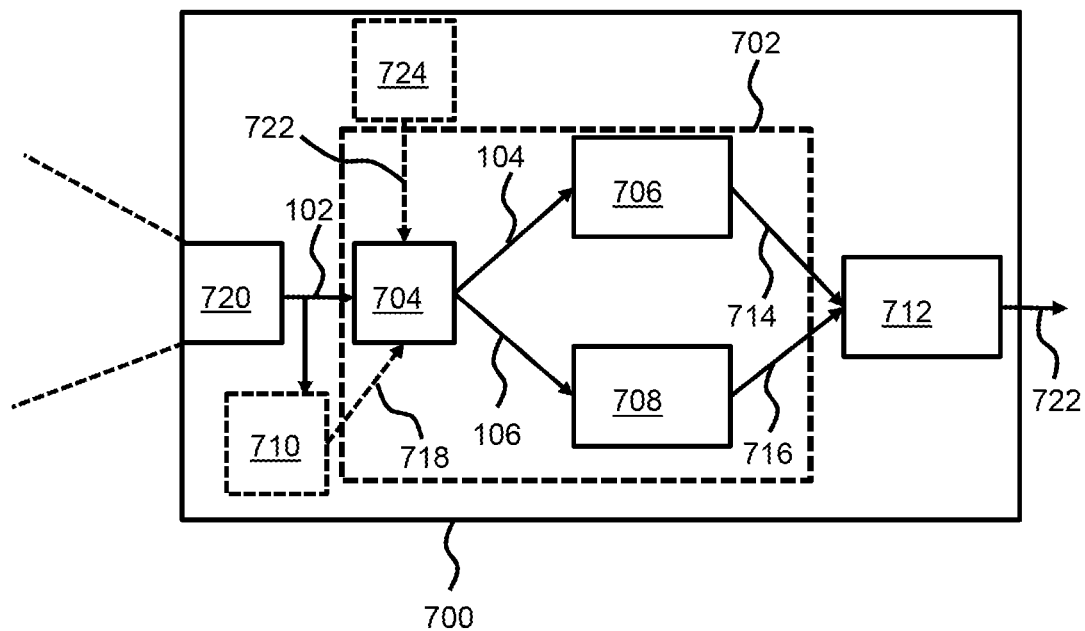
FIG. 7 shows a device for encoding a sequence of image frames according to embodiments.

FIG. 7 schematically shows a video capturing device 700 comprising a device 702 for encoding a sequence of image frames 102. In the example of FIG. 7, the encoding device 702 is thus implemented in the video capturing device 700 but it is equally suitable to implement the encoding device 702 separately from the video capturing device 700, where the encoder device 702 is connected (wireless or wired) to the video capturing device 700 to receive the sequence of image frames 102.

Figure 9:
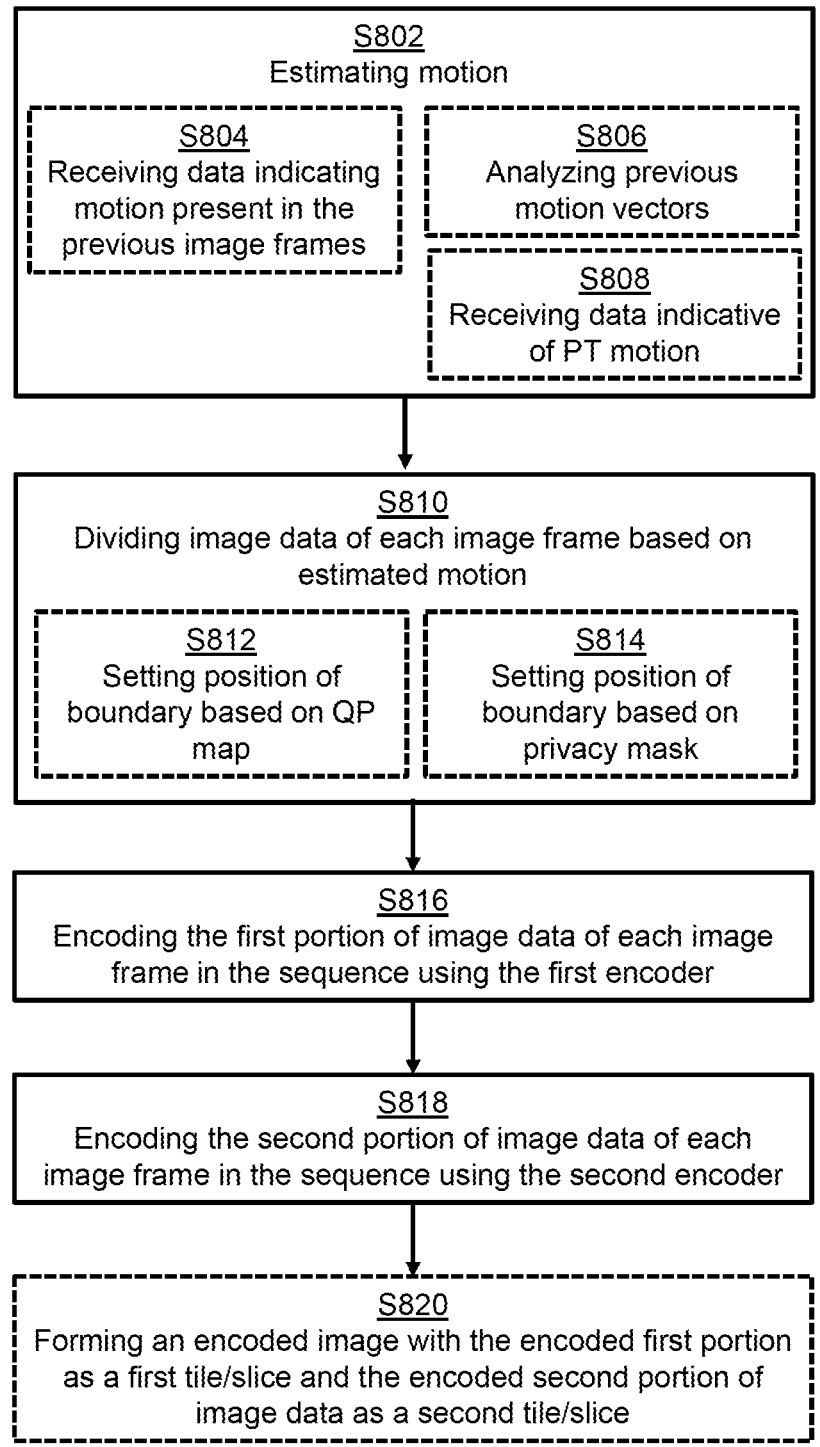
FIG. 9 shows by way of example a method for encoding a sequence of image frames using a first and a second encoder which operate independently of each other.

Embodiments of the implementation of the encoding method described herein will now be explained using FIG. 7 in conjunction with FIG. 9.

The video capturing device 700 comprises an image sensor 720 for capturing a sequence of image frames 102 depicting a scene. The encoding device 702 is adapted to receive the sequence of image frames 102 captured by the image sensor 720. The encoding device 702 comprises a processor 704 configure to estimate S802 motion in the sequence of image frames 102 to determine at least one of: a predominant direction of motion in the image frames, and positions in the image frames where motion is present. Based on the estimated motion, the processor is configured to divide S810 image data of each image frame 102 in the sequence into at least a first 104 and a second 106 portion of image data, wherein a boundary between the first 104 and the second 106 portion is positioned to minimize the estimated motion across the boundary as described above.

The estimation S802 of motion may be done in many ways and will be exemplified below.

For example, the step of estimating motion may comprise receiving S808 data 722 indicative of a pan-tilt, PT, motion of the video capturing device 700 capturing the sequence of image frames 102. For this reason, the video capturing device 700 may comprise a sensor 724 for sensing such motion (e.g. a gyro, or a sensor connected to a PT motor of the camera and receiving control signals from e.g. a control unit controlling the PT motor) and to send data 722 indicative of the PT motion to the processor 704. The processor 704 may then, upon the received data 722 indicating a panning motion, determining the direction of the boundary to be horizontal. In the case of the received data 722 indicating a tilting motion, the direction of the boundary may be determined to be vertical.

In some embodiments, image data of an image frame 102 in the sequence is divided into at least a first 104 and a second 106 portion of image data based on motion which is estimated from previous image frames in the sequence.

For example, the processor 704 may be configured to estimate motion using received S804 data 718 indicating motion present in the previous image frames in the sequence, and using the received data for estimating motion from the previous image frames. In this embodiment, the encoding device 702 is connected to a motion analysing unit 710 which also receives the sequence of image frames 102 and analyse their respective image content for determining the motion present in the image frames 102 using any suitable method. In one embodiment, the motion analysing unit 710 sends motion vectors calculated for the image frames 102 which it receives (in some embodiments using a down sampled version of them to reduce computational complexity), and send these as data 718 to the processor 704 to be used for estimating S802 motion.

Alternatively, or additionally, the step of estimating motion comprises analysing S806 motion vectors calculated by the first and the second encoder when encoding the first and the second portions, respectively, of the previous image frames.

When using motion vectors for previous image frames for estimating S802 motion, several methods may be used.

For example, the length and position of the motion vectors may be used to estimate positions in the image frames where motion is mostly present (e.g. as described in conjunction with FIG. 3)

In a low complexity embodiment, the motion vectors (e.g. received from the motion analysing unit 710 or from the encodes 706, 708), from one or several from several previous image frames, are averaged to find a predominant direction of motion. In another embodiment, the average value of the absolute value of each motion vector is calculated, to e.g. determine if the predominant direction of motion is vertical or horizontal.

It should be noted that the motion vectors close to the boundary of a previous image, as calculated by the encoders 706, 708, may not accurately estimate motion in the image frame 102, since the motion vectors in this area is restricted from crossing the boundary. In some embodiments, motion vectors close to the boundary are disregarded when estimating the motion.

In some embodiments, the size of the residuals of the macroblocks near the boundary may be used to determine if the estimated motion in a previous image frame was incorrect. In this case, the direction of the boundary may be changed from e.g. horizontal to vertical or vice versa.

In a more complex, but sometimes a more accurate embodiment, a plurality of boundaries may be tested using the motion vectors, to determine, based on how many motion vectors that will extend over respective boundary position and direction, a best position and direction for the boundary such that estimated motion across the boundary is minimized. In some embodiments, also the length of the respective motion vectors is used as a weight, such that a shorter motion vector crossing the boundary is preferred over a longer motion vector.

In yet other embodiments, the motion vectors are accumulated over time to build a model of the motion over time. For example, for each macroblock/CU, a normal distribution (average value and standard deviation) is held, and updated for each new image frame which becomes part of the model.

According to some embodiments, each macroblocks holds a plurality of normal distributions, which each defines different types of motion that may take place in the scene corresponding to the macroblock. For example, if a macroblock represents a road, the motion will be zero if no one is moving on the road, the motion will be fast in one direction when a car passes, and the motion will be slower in another direction when a person crosses the road. When the model is to be updated with motion in a new image frame, the plurality of normal distributions are considered, and the normal distribution which "fits" to the motion of the new image frame is updated. At the same time, a weight parameter of each normal distribution is updated, the weight parameter defining how often the motion corresponding to a specific normal distribution is happening in the scene (e.g. 40% cars passing, 50% nothing happening and 10% persons crossing the street). When estimating the motion based on the model, the weights for the respective normal distributions are used for estimating a motion for the particular macroblock.

This model may thus be used to determine, by the processor 704, a best position and direction of the boundary, or in other words, to divide S810 image data of each image frame in the sequence into at least a first 104 and a second 106 portion of image data. It should be noted that such a model may be held and updated by either the processor 704 or the motion analysing unit 710. If the model is held by the motion analysing unit 710, the data 718 received S804 by the processor may comprise such model. In other embodiments, the motion analysing unit 710 both hold the model and determine a suitable position for the boundary. In this embodiment, the data 718 received S804 by the processor may comprise one or more suitable positions and direction for a boundary.

When the motion has been estimated S802, the processor thus, based on the estimated motion, divides S810 image data of image frame(s) 102 in the sequence into at least a first 104 and a second 106 portion of image data, wherein a boundary between the first 104 and the second 106 portion is positioned to minimize the estimated motion across the boundary. As described above, the boundary may be dynamically updated during the sequence of image frames, e.g. for each image frame, for every n-th image frame, for every GOP etc.

As mentioned above in conjunction with FIGS. 5-6, a position of the boundary may optionally also be set S812 based on a map of quantization parameters and/or set S814 based on at least one privacy mask.

The first portion 104 of image data is sent to a first encoder 706, and the second portion 106 of image data is sent to a second encoder 708. The first portion 104 of image data of each image frame 102 in the sequence is thus encoded S816 using the first encoder 706, and the second portion 106 of image data of each image frame 102 in the sequence is thus encoded S818 using the second encoder 708. As described above, the first 706 and second 708 encoder operate independently of each other, in that no data is transmitted/copied between the encoders for inter encoding purposes. The only data used for block matching of a block of pixels of a first portion of an image frame 102 (encoded by the first encoder) is thus (a decoded version of) pixel data of a first portion of an image frame 102 that has already been encoded by the first encoder, and similar for the second encoder. The encoders 706, 708 thus each comprise a separate buffer memory (not shown) where image data used for reference encoding (inter encoding, P-frame, B-frame etc.) is stored and continuously replaced.

In the embodiment of FIG. 7, the video capturing device 700 further comprises a separate stream multiplexer 712, which for each image frame in the sequence, receives the first portion of image data encoded by the first encoder and the second portion of image data encoded by the second encoder, forms S820 an encoded image 722, the encoded image comprising the encoded first portion of image data 714 as a first tile or a first slice and the encoded second portion of image data 716 as a second tile or a second slice. The stream multiplexer may in some embodiments be unit separate from the video capturing device 700, and in other embodiments implemented in one of the first 706 and second 708 encoders.

Additionally, variations to the disclosed embodiments can be understood and effected by the skilled person, from a study of the drawings, the disclosure, and the appended claims. For example, in the description and drawings, two encoders are used. However, the encoding may be done splitting the image data into more than two slices or tiles, using more than two encoders. Further, although the embodiments have been described in the context of splitting one image frame into two or more portions, the same principles may be used for producing one image frame from two or more image sensors.

The invention claimed is:

1. A method for encoding a sequence of image frames using a first and a second encoder which operate independently of each other, the method comprising:
   estimating motion in the sequence of image frames to determine at least one of: a predominant direction of motion in the image frames, and
   positions in the image frames where motion is present;
   based on the estimated motion, dividing image data of each image frame in the sequence into at least a first and a second portion of image data, wherein a boundary between the first and the second portion is positioned to minimize the estimated motion across the boundary, and wherein the boundary between the first and the second portion is positioned in a same location and direction for a plurality of image frames of the sequence, forming a first group of pictures, GOP;

encoding the first portion of image data of each image frame in the sequence using the first encoder; and encoding the second portion of image data of each image frame in the sequence using the second encoder.

2. The method according to claim 1, wherein the boundary between the first and the second portion is positioned in a first position and direction for the first GOP and in a second position and direction for a second GOP.

3. The method according to claim 1, wherein upon determining that the predominant direction of motion in the image frames is a horizontal direction, the direction of the boundary is horizontal;

wherein upon determining that the predominant direction of motion in the image frames is a vertical direction, the direction of the boundary is vertical.

4. The method according to claim 1, wherein the dividing of image data of each image frame of the sequence into at least a first and a second portion of image data further is based on a map of quantization parameters used when encoding the sequence of image frames, the map of quantization parameters specifying quantization parameters used when compressing different regions of image data of the image frames of the sequence, wherein the quantization parameters are weighted in to favor positioning the boundary in a region of image data encoded with a higher quantization parameter over a region of image data encoded with a lower quantization parameter.

5. The method according to claim 1, wherein the dividing of image data of each image frame of the sequence into at least a first and a second portion of image data further is based on at least one privacy mask applied to the sequence of image frames, wherein a position and size of each of the at least one privacy masks is weighted in to favor positioning the boundary in a region of image data corresponding to a privacy mask over a region of image data not corresponding to a privacy mask.

6. The method according to claim 1, wherein the step of estimating motion comprises receiving data indicative of a pan-tilt, PT, motion of a video capturing device capturing the sequence of image frames, wherein upon the received data indicating a panning motion, the direction of the boundary is horizontal;

wherein upon the received data indicating a tilting motion, the direction of the boundary is vertical.

7. The method according to claim 1, wherein image data of an image frame in the sequence is divided into at least a first and a second portion of image data based on motion which is estimated from previous image frames in the sequence.

8. The method according to claim 7, wherein the step of estimating motion comprises receiving data indicating motion present in the previous image frames in the sequence and using the received data for estimating motion from the previous image frames.

9. The method according to claim 7, wherein the step of estimating motion comprises analyzing motion vectors calculated by the first and the second encoder when encoding the first and the second portions, respectively, of the previous image frames.

10. The method according to claim 1, further comprising the steps of:

for each image frame in the sequence, receiving, by a stream multiplexer, the first portion of image data encoded by the first encoder and the second portion of image data encoded by the second encoder, and forming an encoded image, the encoded image comprising the encoded first portion of image data as a first tile or a first slice and the encoded second portion of image data as a second tile or a second slice.

11. The method according to claim 8, wherein the step of estimating motion comprises analyzing motion vectors calculated by the first and the second encoder when encoding the first and the second portions, respectively, of the previous image frames.

12. A computer program product comprising a computer-readable storage medium with instructions executed by a device having processing capability, adapted to carry out the following method to encoding a sequence of image frames using a first and a second encoder which operate independently of each other, the method comprising:

estimating motion in the sequence of image frames to determine at least one of: a predominant direction of motion in the image frames, and positions in the image frames where motion is present;

based on the estimated motion, dividing image data of each image frame in the sequence into at least a first and a second portion of image data, wherein a boundary between the first and the second portion is positioned to minimize the estimated motion across the boundary, and wherein the boundary between the first and the second portion is positioned in a same location and direction for a plurality of image frames of the sequence, forming a first group of pictures, GOP;

encoding the first portion of image data of each image frame in the sequence using the first encoder; and encoding the second portion of image data of each image frame in the sequence using the second encoder.

13. A device for encoding a sequence of image frames, comprising: a processor configured to:

estimate motion in the sequence of image frames to determine at least one of: a predominant direction of motion in the image frames, and positions in the image frames where motion is present;

based on the estimated motion, divide image data of each image frame in the sequence into at least a first and a second portion of image data, wherein a boundary between the first and the second portion is positioned to minimize the estimated motion across the boundary, and wherein the boundary between the first and the second portion is positioned in a same location and direction for a plurality of image frames of the sequence, forming a first group of pictures, GOP;

a first encoder configured to encode the first portion of image data of each image frame in the sequence; and a second encoder configured to encode the second portion of image data of each image frame in the sequence, wherein the first and the second encoder operate independently of each other.

14. The device according to claim 13, further comprising a stream Multiplexer;

wherein the stream multiplexer is arranged to receive the first portion of image data encoded by the first encoder and the second portion of image data encoded by the second encoder, and to form an encoded image, the encoded image comprising the encoded first portion of image data as a first tile or a first slice and the encoded second portion of image data as a second tile or a second slice.

\* \* \* \* \*